United States Patent Office 3,360,584
Patented Dec. 26, 1967

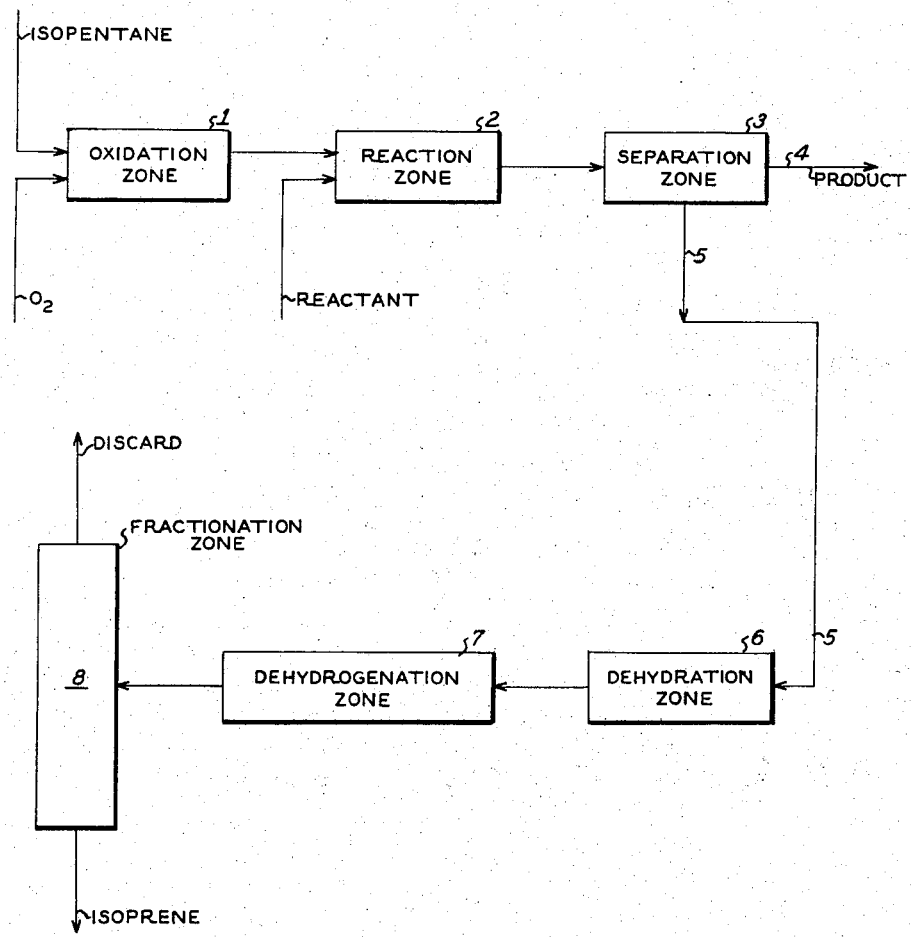

3,360,584
PROCESS FOR THE CO-PRODUCTION OF ISO-
PRENE AND OXYGENATED COMPOUNDS
FROM ISOPENTANE HYDROPEROXIDE
John Kollar, Wallington, N.J., assignor to Halcon International, Inc., a corporation of Delaware
Continuation of application Ser. No. 458,614, May 25, 1965. This application Apr. 17, 1967, Ser. No. 631,554
7 Claims. (Cl. 260—681)

This is a continuation of application Ser. No. 458,614, filed May 25, 1965, now abandoned.

The present invention is directed to a new and improved process for the production of isoprene. In particular, the invention is concerned with the coproduction of isoprene and another valuable material such as an oxirane compound, an oxime, acrylic acid or acrylate, or the like.

Both isoprene and materials such as oxirane compounds and others as mentioned above are of very great commercial importance. Isoprene is an important monomer which finds wide utility in the production of "synthetic natural rubber" as well as in many other uses. Oxirane compounds such as propylene oxide likewise have an extremely wide use in the preparation of various polymers, surface active agents, and the like. The acrylate type compounds are, of course, exceedingly valuable in the formulation of various polymeric materials whereas oximes themselves are valuable and also serve as useful intermediates in the preparation of other chemicals. Although methods have previously been known for the preparation of these materials, there has been considerable room for improvement in the economy of the production of these materials by prior methods.

It is an object of the invention to provide a method for the production of isoprene, which method involves the coproduction of another valuable commercial material.

It is an object of the invention to provide an improved method for the coproduction of isoprene and an oxirane compound.

It is an object of the invention to provide an improved method for the coproduction of isoprene and an acrylic acid or ester.

It is an object of the invention to provide a method for the coproduction of isoprene and an oxygenated amine such as an oxime.

It is a particular object of the invention to provide a method for the coproduction of isoprene and propylene oxide using propylene, isopentane and air as the essential materials consumed in the process.

Other objects will be apparent from the following description of the invention.

The attached drawing illustrates in diagrammatic form the particular embodiment of the invention.

In accordance with the invention, isopentane is oxidized with molecular oxygen at conditions effective for the efficient conversion of the isopentane to 2-methyl-2-hydroperoxy butane. This hydroperoxide (hereinafter called isopentane hydroperoxide) is catalytically reacted with another charge material under conditions such that the additional charge material is converted to the valuable coproduct while the hydroperoxide is converted to the corresponding alcohol, 2-methyl-butanol-2 (t-amyl alcohol). The resulting mixture is separated into the various components and the said coproduct is recovered. The alcohol is converted by dehydration and dehydrogenation techniques to the important isoprene product.

The advantages achieved through practice of the invention are readily apparent. Isopentane, which is normally of but slight value and exceedingly difficult to convert to isoprene, is up-graded at very little cost while being used to produce important and valuable commercial products. The up-graded isopentane in the much more valuable t-amyl alcohol form is then conveniently converted to the very valuable product isoprene. There is a distinct and cooperative effect between the various steps of the inventive process since a material which is difficult to convert directly to isoprene is used in the preparation of another valuable chemical while simultaneously being converted to a form which is highly useful in isoprene production.

Referring to the drawing, isopentane is oxidized with molecular oxygen to isopentane hydroperoxide in oxidation zone 1. The oxidation is a liquid phase reaction carried out broadly at temperatures in the range of 100° to 200° C., preferably 100° to 160° C., and at pressures ranging from about 100 to 800 p.s.i.g. Air which may be diluted with inert gases is preferably employed as the source of molecular oxygen. However, molecular oxygen from other sources can also be employed. The oxidation is carried out under conditions effective to promote formation of the hydroperoxide. Isopentane conversions per pass of the order of 10 to 50° are preferred. Various additives may be employed to stabilize the system and to promote the production of hydroperoxide.

The mixture of hydroperoxide in hydrocarbon is removed from oxidation zone 1 and passed to zone 2 wherewherein the hydroperoxide is catalytically reacted with another material such as propylene to produce the valuable coproduct and to convert the hydroperoxide to t-amyl alcohol.

In one embodiment, the hydroperoxide is reacted in zone 2 with an olefin to convert the olefin to an oxirane compound and the hydroperoxide to t-amyl alcohol.

The epoxidation using the isopentane hydroperoxide is carried out in the presence of epoxidation catalysts which may be compounds of the following:

Ti, V, Se, Cr, Zr, Nb, Ta, Te, U, Mo, W and Re. The preferred catalysts are compounds of Mo, Ti, V, W, Re, Se, Nb, and Ta.

The amount of metal in solution used as catalyst in the expoxidation process can be varied widely, although as a rule it is desirable to use at least 0.0001 mols and preferably 0.002 to 0.03 mols per mol of hydroperoxide present. Amounts greater than about 0.1 mol seem to give no advantage over smaller amounts, although amounts up to 1 mol or more per mol of hydroperoxide can be employed. The catalyst remains dissolved in the reaction mixture throughout the process and can be reused in the reaction after removal of the reaction products therefrom. The molybdenum compounds include the molybdenum organic salts, the oxides such as $Mo_3O_3$, $MoO_3$, molybdic acid, the molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such for example, as aceto-acetonates may also be used. Specific and preferred catalytic compounds of this type for use in the invention are the naphthenates and carbonyls of molybdenum, vanadium, titanium, tungsten, rhenium, niobium, tantalum and selenium. Alkoxy compounds such as tetrabutyl titanate and other like alkyl titanates are very useful.

Temperatures which can be employed in the epoxidation can vary quite widely depending upon the reactivity and other characteristics of the particular system. Temperatures broadly in the range of about 20° to 200° C., desirably 0° to 150° C., and preferably 50° to 120° C., can be employed. The reaction is carried out at pressure conditions sufficient to maintain a liquid phase. Although sub-atmospheric pressures can be employed, pressures usually in the range of about atmospheric to about 1000 p.s.i.g. are most desirable.

As to the substrate, olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinyl cyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers.

The lower olefins having about 3 to 4 carbon atoms in an aliphatic chain are advantageously epoxidized by this process. The class of olefins commonly termed alpha olefins or primary olefins are epoxidized in the particularly efficient manner by this process. It is known to the art that these primary olefins, e.g., propylene, butene-1, decene-1, hexadecene-1, etc. are much more difficultly epoxidized than other forms of olefins, excluding only ethylene. Other forms of olefins which are much more easily epoxidized are substituted olefins, alkenes with internal unsaturation, cycloalkenes and the like.

In the oxidation of the substrate, the ratio of olefin substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed. Additionally, it is advantageous to carry out the reaction to achieve as high a hydroperoxide conversion as possible, preferably at least 50% and desirably at least 90%, consistent with reasonable selectivities.

Basic substances can be employed in the epoxidation. Such basic substances are alkali metal compounds or alkaline earth metal compounds. Particularly preferred are the compounds of sodium, potassium, lithium, calcium, magnesium, rubidium, cesium, strontium, and barium. Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium stearate, magnesium carbonate, and the like. Hydroxides and oxides of alkali and alkali earth metal compounds can be used. Examples are NaOH, MgO, CaO, Ca(OH)$_2$, KOH, and the like, alkoxides, e.g. Na ethylate, K-cumylate, Na phenate etc., can be used. Amides such as NaNH$_2$ can be used as can quaternary ammonium salts. In general, any compound of alkali or alkali earth metals giving a basic reaction in water can be used.

The compound is employed during epoxidation reaction in amount of .05 to 10 mols/mol of epoxidation catalyst desirably, .25 to 3.0 and preferably .50 to 1.50. It has been found that as a result of the incorporation of the basic compound in the reaction system, significantly improved efficiencies in the utilization of the organic hydroperoxides in the expoxidation is achieved.

That is, using the basic compound there results a higher yield of oxirane compound based on hydroperoxide consumed. Also, of the hydroperoxide consumed, a greater amount is reduced to the alcohol instead of other undesirable products through the invention.

Additionally, through use of the basic compound it is possible to employ lower unsaturated compound to hydroperoxide ratios and thus to improve unsaturated compound conversions while retaining satisfactory high reaction selectivities.

In a second embodiment, the hydroperoxide is reacted in zone 2 with a primary amine to form oxygenated amine products such as ketoximes and t-amyl alcohol. Conditions for this reaction are as follows:

Temperatures which can be employed in the oxidation vary quite widely depending upon the reactivity and other characteristics of the other reactants. Temperatures broadly in the range of about −10° to 175° C., desirably 25° to 130° C., and preferably 60° to 110° C., can be employed. The reaction is carried out at pressure conditions sufficient to maintain a liquid reaction phase. Although sub-atmospheric pressures can be employed, pressures usually in the range of about atmospheric to somewhat above are most desirable.

The catalysts include compounds of the following: Ti, V, Cr, Se, Zr, Nb, Mo, Te, Ta, W, Re, and U. These may be characterized as forming peracids or as hydroxylation catalysts.

The amount of metal in solution used as catalyst in the process can be varied widely, although as a rule it is desirable to use at least 0.0001 mol and more preferably 0.001 to 0.01 mol per mol of hydroperoxide present. Amounts greater than about 0.1 mol seem to give no advantage over smaller amounts. The catalysts remain dissolved in the reaction mixture throughout the process and can be reused in the reaction after removal of the reaction products therefrom. The ratio of the hydroperoxide to the amine is in the range of 0.01 to 10 mols per mol of the amine, preferably 0.5 to 2.

The molybdenum compounds include molybdenum organic salts, the oxides such as Mo$_2$O$_3$, MoO$_2$, molybdic acid, MoO$_3$, the molybdenum chlorides and oxychlorides, molybdenum fluoride, phosphate, sulfide, and the like. Hetero-polyacids containing molybdenum can be used as can salts thereof; examples include phosphomolybdic and the sodium and potassium salts thereof. Corresponding or analogous compounds of the other metals mentioned above may be used.

It has been discovered that titanium compounds have unexpected and surprising utility in this reaction. Titanium compounds have been found to be outstandingly effective in the reaction of organic hydroperoxides with amines.

Inorganic as well as organic titanium compounds can be used, although organic compounds give much better results. Preferred titanium compounds are esters or salts of organic acids and are preferably derived from aliphatic or aromatic alcohols and organic acids. Specific examples are tetra n-butyl titanate, di n-butyl di (2,6,t-butyl p-cresyl) titanate, n-butyl trioleoyl titanate, tetra o-cresyl titanate, tetra t-butyl titanate, titanium naphthenate, titanium stearate, titanium ethylhexoate, titanium acetate, and the like. Inorganic compounds such as titanium tetrachloride and the like are useful.

With titanium compounds which hydrolyze readily, it is desirable to remove water of oxidation from the reaction zone during the reaction such as by azeotroping with benzene or the like.

For practice of the present invention, catalytic components may be employed in the form of a compound or mixture which is initially soluble in the reaction medium. While solubility will, to some extent depend on the particular reaction medium employed, suitably soluble substances contemplated by the invention would include hydrocarbon-soluble, organo-metallic compounds having a solubility in methanol at room temperature of at least 0.1 gram per liter. Illustrative soluble forms of the catalytic materials are the naphthenates, stearates, octoates, carbonyl and the like. Various chelates, association compounds and enol salts, such, for example, as aceto-acetonates may also be used. Specific and preferred catalytic compounds of this type for use in the invention are the naphthenates and carbonyls of molybdenum, vanadium and tungsten and especially the various titanium compounds.

The oxidation reaction time will vary depending upon the conversion desired. Very short reaction times can be employed where low conversion and/or very active materials are employed. Normally, reaction times from about 1 minute to 6 hours and desirably from 5 minutes to 2 hours are employed.

The amines used are primary and the amine group may be attached to a primary or secondary saturated carbon atom, and may contain 1 to 20 carbon atoms, preferably 4 to 16 carbon atoms, e.g., benzylamine, isopropylamine, n-butylamine, cyclohexylamine, cyclooctylamine, cyclododecylamine and the like amine substituted saturated aliphatic groups, which may be cyclic or acyclic, which groups may contain cyclic aryl or alkyl substituents.

The concentration of the amine in the reaction mixture may be in the range of 5 to 60% by weight, preferably in the range of 5 to 15%.

The concentration of hydroperoxide in the oxidation reaction mixture at the beginning of the reaction will normally be one percent or more although lesser concentrations will be effective and can be used.

The reaction is suitably carried out in the substantial absence of water. Relatively small amounts of water can be tolerated during the reaction but it is preferable to exclude water from the system during the major part of the reaction.

The process is most advantageously carried out in the presence of a solvent.

A preferred solvent or diluent is t-butanol. However, other alcohols such as t-amyl alcohol, di-methyl propyl carbinol, methyl diethyl carbinol, dimethyl phenyl carbinol and the like may be used. Primary or secondary alcohols may also be used, such as methanol, ethanol, n- or i-propanol, i- or n- or s-butanol as well as analogous pentanols or hexanols. Also, ethers such as diethyl ethers, ketones such as cyclohexanone may be used. The lower aromatic hydrocarbons are suitable solvents as are the lower boiling chlorinated hydrocarbons including chlortoluene.

Where the oxime produced is intended as an intermediate for further synthesis, one may use the crude oxime. If the oxime is to be rearranged, an acid such as sulfuric acid may be mixed with the oxime and heated, in known manner, to convert cyclohexanone oxime to caprolactam.

An important feature of the invention is that cyclohexyl hydroxylamine may be made and this can be further air oxidized to the oxime. Production of this product has the advantage that only 1 mol of hydroperoxide is consumed to make it while 2 mols are needed to produce oxime.

In a third embodiment the hydroperoxide is reacted in zone 2 with an unsaturated aldehyde to form an unsaturated acid or ester and to convert the hydroperoxide to t-amyl alcohol.

The reaction of the isopentane hydroperoxide with the acrolein or methacrolein may be carried out in any convenient solvent or diluent, but the tertiary amyl alcohol is preferred for making the acid, an esterifying alcohol being used for making the ester directly, where desired. Generally, the latter alcohol is primary, or sometimes secondary, preferably of one to twelve carbon atoms.

Other alcohols such as t-butyl alcohol, dimethyl propyl carbinol, methyl diethyl carbinol, dimethyl phenyl carbinol and the like may be used for making the acid. Primary or secondary alcohols may be used, such as methanol, ethanol, N- or i-propanol, i- or n- or s-butanol and the like pentanols or hexanols may be used. Also for making the acid, ethers such as diethyl ethers esters, ketones such as acetone may be used; or acids such as acetic acid and the like may be used as well as esters thereof such as methyl, ethyl, propyl, butyl, and the like. The lower aromatic hydrocarbons are suitable as well as the lower boiling chlorinated hydrocarbons including chlortoluene. Other saturated hydrocarbons or even unsaturated hydrocarbons may be used including purified butylenes, hexylenes, propylene trimers or tetramers, or butylene dimers or trimers using appropriate pressure to maintain the solvent in a liquid phase.

Alternate catalysts can be used for the reaction of the hydroperoxide and unsaturated aldehyde, but chromic acid is preferred for making the acid. Other catalysts may include phosphomolybdic acid, tungstochromic acid, selenochromic acid, phosphovanadic acid, and the like.

In producing the methyl ester directly from the aldehyde, the reaction is conveniently carried out by adding the hydroperoxide or mixture thereof together with a redox agent to a solution of the alpha, beta-ethylenic aldehyde in the chosen reactive medium, for example, methanol or the like. Ferrous or ferric ion is a particular useful redox agent and can be introduced by adding ferrous or ferric chloride or other soluble iron salt to the reaction mixture. However, any of the many other known redox agents can be used instead of or together with the ferrous or ferric ions in the new process. Suitable examples of such redox agents include the ions of other heavy metals which are capable of existence in several valence states such as cobaltous, manganous, cuprous, titanous, chromous, vanadous and like ions.

In some cases sodium bisulfite, 1-ascorbic acid, sodium formaldehyde sulfoxylate, the reducing sugars, and the like may be used to reduce the higher valence ions. The reducing agent or mixture of agents used is employed in an amount equivalent to or in an excess of, for instance, up to about 10%, the stoichiometric requirement for reduction of the t-butyl hydroperoxide. Instead of a stoichiometric amount of ferrous ions, one can, if desired, use in the process a trace of a multivalent metal, preferably ferrous or ferric ion together with another of the aforementioned other reducing agents in stoichiometric amount which will serve to reduce the ferric ion to ferrous ion as fast as the ferric ion is formed.

Ferrous ion is the preferred promoter in this type of operation and is advantageously used in amounts of about 0.25 to about 1 equivalent per mol of hydroperoxide employed. In either case, a temperature of about −20° C. to about 150° C. can be used although it is generally preferable to employ temperatures of about 0° to about +20° C. in order to minimize loss of aldehyde either through volatilization or side reaction. The time of reaction is not critical.

In another alternative, the reaction is carried out by adding isopentane hydroperoxide or mixture containing it and a redox agent to a solution of an aldehyde such as an alpha, beta-ethylenic aldehyde in the apppropriate reactive primary or secondary alkanol, for example, methanol, ethanol, or other non-tertiary alcohol having up to about 12 carbon atoms in the molecule. Ferrous or ferric ion is a preferred redox agent, and it can be introduced by adding ferrous or ferric chloride or other soluble iron salt or salts to the reaction mixture; chlorides and bromides are the preferred salts. Other known redox agents which can be used instead of or together with the ferrous or ferric ions in the new process include cobaltous, manganous, stannous, cerous, nickelous, plumbous, titanous, chromous, vanadous and the like ions in solution, or mixtures thereof. These metals have atomic numbers 22 to 28, 50, 58 to 82.

The redox agent or mixtures thereof can be employed in stoichiometric amounts relative to the hydroperoxide or in excess thereof; e.g., up to about double the amount. However, less than stoichiometric amounts are operable and generally preferable. In general at least 0.05 equivalent of redox agent or agents per equivalent of hydroperoxide is used; a desirable range is 0.1 to or equivalent of agent per equivalent of hydroperoxide. As compared to the cupric ion method, this modification may be regarded as catalytic, in view of the lower amount of ion.

The redox agents may be employed in any one of their valence states. For example, equally good results are obtained with either ferrous or ferric chloride. An acidic environment is sometimes desirable, and it is achieved by adding a small amount of sulfuric or hydrochloric or other strong acid to the reaction mixture. A redox couple may be employed, for example ferrous ferric or cobaltous-cobaltic, and the like, or a mixed couple such as cobaltous ferric, manganous-stannic and the like.

While chlorides and bromides are preferred, compounds containing other anions may be employed in practicing this alternative to produce esters. These give similar results to those shown in Examples 1 and 2 and either iron halide or mixtures thereof are preferred.

For making the ester directly, one may employ the aldehyde, the hydroperoxide, the alkanol such as methanol or the like and chromic acid (or phosphomolybdic, tungstochromic, selenochromic, phosphovanadic acid, or the like).

The concentration of the aldehyde or acrolein in the reaction mixture may be in the range of 1 to 50% by weight, preferably in the range of 10 to 20%. The reaction temperature may be from −50° C. to +150° C., desirably 0° to 100° C., and preferably in the range of room temperature or somewhat below up to about 60° C. The pressure may be atmospheric, or above or below, and the reaction time may be in the range of 10 minutes to 6 hours, and desirably 0.5 to 3 hours. For many runs, a one hour reaction time is suitable.

The ratio of the hydroperoxide is in the range of 0.1 to 2 mols per mol of the acrolein, preferably 0.5 to 1.0.

The process may be carried out batchwise, or in an intermittent or continuous manner. As the latter, the reaction may be carried out in an elongated reaction zone such as a tube or a tower or a plurality of reactors connected in series, and the hydroperoxide may be introduced at space points along the path of flow of the solution or mixture.

If it is desired to produce an ester of methacrylic acid from the acid the appropriate alcohol may be added to the reaction mixture. The reaction mixture containing the added alcohol such as methanol is heated to effect esterification and remove the water formed. Then the mixture may be separated into fractions by distillation. Any catalyst present remains in the residue and it may be recovered and reused in the oxidation step. Other embodiments are possible.

The reaction mixture from zone 2 is passed to separation zone 3 wherein by appropriate distillation operations the mixture is resolved into its components. The coproduct is depicted as being removed via line 4.

t-Amyl alcohol is removed via line 5 and passed to dehydration zone 6. Although separation zone 3 is simply shown, the zone preferably comprises a series of distillation columns. In these columns the unreacted portion of the charge materials are recovered and appropriately recycled to the process (not shown). Catalyst is also recovered and recycled.

The t-amyl alcohol is dehydrated to isopentene in zone 6. The dehydration conditions are illustratively temperatures in the range of 100° to 350° C., preferably 150° to 250° C., pressures of atmospheric to about 50 p.s.i.g., and catalysts such as alumina, titania, silica, MgO, ZnO, and $ThO_2$ are used.

The isopentene is passed to dehydrogenation zone 7 and there dehydrogenated to isoprene. Dehydrogenation conditions illustratively are temperatures of 500 to 800° C., preferably 600° to 700° C., pressures of 5 to 50 p.s.i.a., preferably 15 to 30 p.s.i.a., and catalysts such as $Cr_2O_3$, $F_2O_3ZnO$, $CoO$, and mixtures are used.

The dehydrogenation effluent is fractionated in zone 8 and product isoprene recovered.

It will be apparent to skilled workers that numerous other embodiments are possible. For example, the t-amyl alcohol can be converted to isoprene by a number of quite different routes. The t-amyl alcohol can be oxidized to the glycol and subsequently dehydrated to isoprene. Alternatively, the t-amyl alcohol can be dehydrated to the olefin which olefin is then converted to the epoxide and subsequently to the glycol and finally dehydrated. Also, the t-amyl alcohol can be subjected to a simultaneous dehydration and dehydrogenation with direct production of isoprene.

The following examples illustrate the invention.

EXAMPLES

Oxidation of isopentane

Isopentane containing 0.4 wt. percent butyl hydroperoxide as initiator is oxidized with 10% $O_2$ at 140° C., 500 p.s.i.g. for 3.7 hours in a steel autoclave. Conversion is 25%. Selectivity to hydroperoxide is 50%. The effluent is distilled at atmospheric pressure to remove the unreacted isopentane leaving as a bottoms 52 wt. percent isopentane hydroperoxide in primarily t-amyl alcohol.

Epoxidation

A mixture of 100 grams of the above concentrate (0.5 moles hydroperoxide), 168 grams (4 moles) of propylene and 1.0 gram of molybdenum naphthenate containing 5% Mo is heated in a pressure vessel at 130° C. for 2 hours. The effluent is distilled in a 5-plate column at 5/1 reflux ratio and at atmospheric pressure to recover propylene, propylene oxide, and t-amyl alcohol as follows:

| Cut | Head Temp., ° C. | Amount, g. | Major Component |
| --- | --- | --- | --- |
| 1 | −46 to −30 | 150.0 | Propylene. |
| 2 | −30 to 33 | 1.4 | |
| 3 | 33 to 36 | 22.0 | Propylene Oxide. |
| 4 | 36 to 90 | 2.1 | |
| | 90 to 96 | 4.0 | Methyl isopropyl ketone. |
| 5 | 96 to 103 | 84.0 | t-Amyl alcohol. |

The yield of propylene oxide based in hydroperoxide is 78% and the hydroperoxide conversion is substantially complete.

The ketone is hydrogenated over a copper chromite catalyst at 50 p.s.i.g. and 150° C. and the alcohol combined with the t-amyl alcohol.

Dehydration

The mixed alcohols are dehydrated in the vapor phase over alumina at 250° C. at a LHSV of 1 and at atmospheric pressure. Conversion is 95% with selectivity to isopentenes of 98%.

The dehydration effluent is distilled in a 5 plate still at a 2/1 reflux ratio and products recovered as follows:

| Cut | Head Temp., °C. | Wt. percent of charge | Major Component |
|---|---|---|---|
| 1 | To 30 | 0.5 | |
| 2 | 30 to 40 | 74.0 | Isopentenes. |
| 3 | Residue | 25.5 | Unconverted alcohol, water and heavy ends. |

Dehydrogenation of isopentenes

The catalyst is 78.5 MgO, 20 $Fe_2O_3$, 5 CuO, and 5 $K_2O$ (parts by weight). The conditions of operation are:

Feed rate (volumes of hydrocarbon vapor (STP) vol. of catalyst/hr.) _____ 476
Volumes steam/vol. hydrocarbon _____ 7/1
Temp., ° F. _____ 1200
Conversion, percent _____ 42
Selectivity to isoprene, percent _____ 65

The effluent is subjected to extractive distillation to separate isoprene. In a 50 plate column at 25 p.s.i.g. the effluent is distilled using aqueous acetone in amount by volume of 2 parts aqueous acetone per part of hydrocarbon feed. Isoprene in admixture with solvent is withdrawn as a sidestream vapor product. The isoprene is separated from this stream by water extraction of the solvent.

Oxidation of isopentenes

A portion of the isopentenes containing 50 p.p.m. of cobalt as the naphthenate are oxidized at 130° C., 500 p.s.i.g. with air. At 10% conversion, selectivity to epoxides is 55%. The epoxides are separated by atmospheric pressure distillation in a 5 plate column at 5/1 reflux ratio.

| Cut | Head Temp., °C. | Wt. Percent of Charge | Major Component |
|---|---|---|---|
| 1 | 30–40 | 87.0 | Isopentenes. |
| 2 | 40–70 | 0.5 | |
| 3 | 70–83 | 6.0 | Epoxides. |
| 4 | Residue | 6.5 | |

The epoxides are dehydrated over a thoria catalyst at 400° C. and a liquid hourly space velocity of 0.3. Conversion of epoxide is 100% and analysis of the effluent shows 47% yield of isoprene. The effluent is distilled in a 20-plate column at 10/1 reflux ratio at atmospheric pressure and product isoprene in amount of 35% of the effluent is recovered at a head temperature of 33–36° C.

Oxidation of primary amine

A solution of 19.8 grams (0.2 mol) of cyclohexylamine in 112 grams of benzene containing 0.002 mol of tetra-n-butyltitanate is refluxed with an overhead condenser and water separator. To this solution 20.0 grams of the hydroperoxide concentrate above obtained (containing 0.1 mol hydroperoxide) is added during a 10-minute period. After completion of this addition, the resulting mixture is refluxed at 82° C. for an additional 1 hour. The resulting reaction mixture upon analysis by gas chromatography is found to contain 0.036 mol of cyclohexanone oxime. This represents a 72% product yield based on hydroperoxide. Hydroperoxide conversion is 100%. The resulting reaction mixture is distilled in order to separate the various product fractions. The distillation is in a 10 plate column at 5/1 reflux ratio at atmospheric pressure.

| Cut | Head Temp., °C. | Wt., g. | Composition |
|---|---|---|---|
| 1 | 79–82 | 96 | Benzene. |
| 2 | 82–103 | 17.5 | $C_5$ Alcohols and ketones. |
| 3 | 103–130 | 1.5 | |
| 4 | 130–136 | 14.5 | Cyclohexylamine. |

The residue containing the oxime is flash distilled at 5 mm. Hg to separate oxime overhead as product.

Oxidation of methacrolein

A solution of 7.5 grams of methacrolein (0.107 mol), 17.3 grams of the above hydroperoxide concentrate (containing 0.086 mol hydroperoxide) and 0.25 gram of $Cr_2O_3$ in 35 grams of anhydrous t-butanol is reacted for 4 hours at 45° C. Hydroperoxide conversion is 91%. Analysis of the reaction effluent shows that 74% of the methacrolein is converted with the selectivity to methacrylic acid being 52%. The effluent is fractionally distilled in order to separate the components, and the mixture of methylpentanols is converted to isoprene in the manner described above.

The distillation is in a 5-plate still at atmospheric pressure. Methacrolein, 1.9 g., is recovered at 50–53° C. and t-butanol at 82–83° C. The bottoms is extracted with 100 ml. of 5% aqueous $NaHCO_3$ solution. The aqueous phase is acidified with HCl, extracted with ether and the ether evaporated leaving 4.9 g. of residue containing 3.5 g. of methacrylic acid. The organic phase from the bicarbonate extraction is distilled at atmospheric pressure in a 5 plate still at 3/1 reflux ratio and a cut taken at 100–104° C. consisting mainly of t-amyl alcohol (13 g.).

What is claimed is:

1. In a process for the production of isoprene from isopentane including the steps of oxidizing isopentane to isopentane hydroperoxide, reducing isopentane hydroperoxide to t-amyl alcohol, and dehydrating and dehydrogenating t-amyl alcohol to isoprene, the improvement wherein said reducing step is carried out by catalytically reacting said isopentane hydroperoxide with a member selected from the group consisting of an olefinically unsaturated compound and a primary amine, said member containing 2 to 30 carbon atoms, under conditions effective to convert said hydroperoxide to t-amyl alcohol and to convert said member to an oxygenated product.

2. A process according to claim 1 wherein said member is an olefinically unsaturated compound comprising an olefin and said oxygenated product is an oxirane.

3. A process according to claim 2 wherein said olefin comprises propylene and said oxirane comprises propylene oxide.

4. A process according to claim 1 wherein said member is an olefinically unsaturated compound comprising an acrylic compound and said oxygenated product is selected from the group consisting of acrylic acid and an acrylate.

5. A process according to claim 4 wherein said acrylic compound is methacrolein and said oxygenated product is methacrylic acid.

6. A process according to claim 1 wherein said member is a primary amine and said oxygenated product is an oxime.

7. A process according to claim 6 wherein said primary amine is cyclohexylamine and said oxime is cyclohexanone oxime.

(References on following page)

References Cited

UNITED STATES PATENTS

| | | | |
|---|---|---|---|
| 2,744,929 | 5/1956 | Smith et al. | 260—530 |
| 3,096,376 | 7/1963 | Clement et al. | 260—681 |
| 3,206,510 | 9/1965 | Weiss et al. | 260—563 |

OTHER REFERENCES

Hawkins, E. G. E., J. Chem. Soc. (London), 1950, pp. 2168–73.

PAUL M. COUGHLAN, JR., *Primary Examiner.*

G. E. SCHMITKONS, *Assistant Examiner.*